(12) United States Patent
Yoshioka (10) Patent No.: US 9,371,761 B2
(45) Date of Patent: Jun. 21, 2016

(54) ELECTRIC HEATING CATALYST (75) Inventor: Mamoru Yoshioka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 13/983,962

(22) PCT Filed: Feb. 10, 2011

(86) PCT No.: PCT/JP2011/052922
§ 371 (c)(1),
(2), (4) Date: Aug. 6, 2013

(87) PCT Pub. No.: WO2012/108047
PCT Pub. Date: Aug. 16, 2012

(65) Prior Publication Data
US 2013/0312395 A1 Nov. 28, 2013

(51) Int. Cl.
*B01D 50/00* (2006.01)
*F01N 3/20* (2006.01)
*H05B 3/42* (2006.01)
*B01J 35/00* (2006.01)
*B01J 35/04* (2006.01)

(52) U.S. Cl.
CPC ........... *F01N 3/2013* (2013.01); *B01J 35/0033* (2013.01); *B01J 35/04* (2013.01); *F01N 3/2026* (2013.01); *H05B 3/42* (2013.01); *H05B 2203/023* (2013.01); *Y02T 10/26* (2013.01)

(58) Field of Classification Search
CPC .......... F01N 3/2026; B01J 35/04; H05B 3/42; Y02T 10/26
USPC .............................................. 422/174; 60/300
See application file for complete search history.

(56) References Cited

U.S. PATENT DOCUMENTS 5,569,455 A * 10/1996 Fukui et al. .................... 422/174
2010/0308849 A1* 12/2010 Bouteiller et al. ............. 324/700

FOREIGN PATENT DOCUMENTS

JP 05-269387 A 10/1993

* cited by examiner

*Primary Examiner* — Tom P Duong
(74) *Attorney, Agent, or Firm* — Sughrue Mion, PLLC (57) ABSTRACT

The present invention is intended to achieve improvement in an exhaust gas purification rate as well as suppression of breakage or damage of a heater element in an electric heating catalyst (EHC), by causing the heater element to generate heat in a more suitable manner. In an EHC according to the present invention, a pair of surface electrodes (7a) are formed in such a manner that they extend spirally from one end toward the other end of a heater element (3), which is formed into a cylindrical shape, along an outer circumferential surface of the heater element (3), and mutually cross each other while sandwiching the heater element (3) therebetween. Moreover, the width in each of the surface electrodes (7a) in the vicinity of their ends which are in contact with circumferences of end faces of the heater element (3) is enlarged.

6 Claims, 9 Drawing Sheets

ELECTRIC HEATING CATALYST

CROSS REFERENCE TO RELATED APPLICATIONS

This application is a National Stage of International Application No. PCT/JP2011/052922filed Feb. 10, 2011, the contents of all of which are incorporated herein by reference in their entirety.

TECHNICAL FIELD

The present invention relates to an electric heating catalyst that is arranged in an exhaust passage of an internal combustion engine.

BACKGROUND ART

In the past, as an exhaust gas purification catalyst arranged in an exhaust passage of an internal combustion engine, there has been developed an electric heating catalyst (hereinafter referred to as an EHC) in which a catalyst is heated by means of a heater element which generates heat by electrical energization thereof.

In addition, in EHCs, there has been known a construction in which a pair of electrodes are connected to a side surface (an outer circumferential surface) of a heater element in a manner to oppose to each other (for example, see a first patent document). In such a construction, the heater element generates heat by an electric current that flows between the electrodes through the heater element.

PRIOR ART DOCUMENTS

Patent Documents

Patent Document 1: Japanese Patent Application Laid-Open No. 05-269387

DISCLOSURE OF THE INVENTION

Problem to be Solved by the Invention

In cases where the pair of electrodes are arranged so as to mutually oppose to each other on the outer circumferential surface of the heater element of a cylindrical shape (including an elliptical cross sectional shape), there are formed surface electrodes which extend along the outer circumferential surface of the above-mentioned heater element. When the electrodes are energized, electric current flows through a portion (hereinafter, this portion being referred to as "an inter-electrode portion") located between the surface electrodes in the heater element. For that reason, the temperature of the inter-electrode portion rises. However, in the heater element, there exists a portion (i.e., an outer circumferential surface vicinity portion in which the surface electrodes are not formed: hereinafter this portion being referred to as "an extra-electrode portion") which is away from or outside from between the surface electrodes. Even if the electrodes are energized, it is difficult for electric current to flow through the extraelectrode part, so the temperature of this extraelectrode part is difficult to rise. Accordingly, the temperature distribution in the circumferential direction (in the widthwise direction orthogonal to the axial direction) of the heater element at the time of energization thereof becomes nonuniform.

If the temperature distribution in the circumferential direction of the heater element becomes nonuniform in this manner, in a low temperature portion of the heater element, the exhaust gas purification capacity of a catalyst will be no longer exhibited to a sufficient extent, thus causing a decrease in an exhaust gas purification rate. In addition, if a variation in the temperature distribution in the heater element becomes large, thermal stress will become large, so there will also be a fear that the heater element may be damaged or broken.

Here, by increasing the width in the circumferential direction of the heater element in the surface electrodes, the proportion occupied by the inter-electrode part in the heater element can be made larger, and the proportion occupied by the extraelectrode part can be made smaller. However, as the width in the circumferential direction of the heater element in the surface electrodes is made larger, the distance between the surface electrodes on the outer circumferential surface of the heater element becomes smaller. When this distance between the surface electrodes on the outer circumferential surface of the heater element becomes small to a certain or more extent, it becomes easy for electric current flowing between the surface electrodes to flow through the outer circumferential surface of the heater element in an intensive manner. As a result, there is a fear that a portion of the outer circumferential surface located between the surface electrodes may rise in temperature to an excessive extent.

The present invention has been made in view of the above-mentioned problems, and has for its object to achieve improvement in an exhaust gas purification rate as well as suppression of breakage or damage of a heater element in an EHC, by causing the heater element to generate heat in a more suitable manner.

Means for Solving the Problem

In an EHC according to the present invention, a pair of surface electrodes are formed in such a manner that they extend spirally from one end toward the other end of a heater element along an outer circumferential surface of the heater element, and mutually cross each other while sandwiching the heater element therebetween. Moreover, the width in each of the surface electrodes in the vicinity of their ends which are in contact with circumferences of end faces of the heater element is enlarged.

More specifically, an EHC according to the present invention is provided with:

a heater element that is formed into a cylindrical shape, and is electrically energized to generate heat so that a catalyst is heated by the generation of heat; and a pair of electrodes that supply electricity to said heater element, and are connected to an outer circumferential surface of said heater element so as to sandwich said heater element therebetween;

wherein said pair of electrodes have surface electrodes formed in such a manner that they extend spirally from one end of said heater element toward the other end thereof along the outer circumferential surface of said heater element, and mutually cross each other while sandwiching said heater element therebetween; and the width in each of said surface electrodes in the vicinity of their ends which are in contact with circumferences of end faces of said heater element is enlarged in a range in which the shortest distance on the outer periphery of said heater element between the surface electrodes in the vicinity of said ends becomes equal to or more than a predetermined lower limit distance.

Here, the predetermined lower limit distance is a distance which is a lower limit value of a distance on the outer periphery of the heater element between the surface electrodes at which it is possible to suppress electric current from flowing through the outer circumferential surface of the heater element, and which is beforehand set based on experiments, etc.

By enlarging the width of each of the surface electrodes at the ends thereof, as in the present invention, it becomes possible to raise the temperature of the heater element in the vicinity of its ends in a wider range in a cross sectional direction orthogonal to an axial direction of the catalyst carrier, while suppressing electric current from flowing through the outer circumferential surface of the heater element at the time of electrical energization thereof. Accordingly, when viewed in the axial direction of the heater element as a whole, the portions thereof, which become low temperature portions at the time of electrical energization, can be made smaller in the cross sectional direction orthogonal to the axial direction of the heater element. For that reason, the exhaust gas purification rate can be improved, and breakage or damage of the heater element can be suppressed.

In the present invention, further, the width in each of the surface electrodes in the vicinity of their longitudinally central portion in a direction parallel to the circumferences of the end faces of said heater element may be enlarged in a range in which the shortest distance on the outer periphery of the heater element between the surface electrodes in the vicinity of said central portion becomes equal to or more than said predetermined lower limit distance.

According to this, it becomes possible to raise the temperature of the heater element in the vicinity of its ends as well as in the vicinity of its longitudinally central portion in a wider range in the cross sectional direction orthogonal to the axial direction of the catalyst carrier, while suppressing electric current from flowing through the outer circumferential surface of the heater element at the time of electrical energization thereof.

In the present invention, the shortest distance on the outer periphery of the heater element between the surface electrodes in those portions in which the width of each of the surface electrodes is not enlarged may be said predetermined lower limit distance. According to this, in those portions of the surface electrodes which are not enlarged in width, it is possible to make the width of each surface electrode as large as possible, while suppressing electric current from flowing through the outer circumferential surface of the heater element.

In the present invention, the shortest distance on the outer periphery of the heater element between the surface electrodes in those portions in which the width of each of the surface electrodes is not enlarged may be larger than the shortest distance on the outer periphery of the heater element between the surface electrodes in those portions in which the width of each of the surface electrodes is enlarged. According to this, in those portions of the surface electrodes which are not enlarged in width, it is possible to suppress, with a higher probability, electric current from flowing through the outer circumferential surface of the heater element.

Effects of the Invention

According to the present invention, in an EHC, a heater element can be made to generate heat in a more suitable manner. As a result, an exhaust gas purification rate can be improved, and breakage or damage of the heater element can be suppressed.

BRIEF DESCRIPTION OF THE DRAWINGS

FIG. 2(a) shows a perspective view of a catalyst carrier, and FIG. 2(b) is a view showing a state in which an outer circumferential surface of the catalyst carrier has been developed.

FIG. 4(a) shows a developed view of the outer circumferential surface of the catalyst carrier in cases where a spiral angle of each surface electrode is relatively large, and FIG. 4(b) shows a developed view of the outer circumferential surface of the catalyst carrier in cases where the spiral angle of each surface electrode is relatively small.

FIG. 6(a) shows a perspective view of a catalyst carrier, and FIG. 6(b) is a view showing a state in which an outer circumferential surface of the catalyst carrier has been developed.

FIG. 10(a) shows a cross sectional view in cases where the width of each surface electrode in a circumferential direction of the catalyst carrier is relatively small, and FIG. 10(b) shows a cross sectional view in cases where the width of each surface electrode in a circumferential direction of the catalyst carrier is relatively large.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

<First Embodiment>

Figure 1:
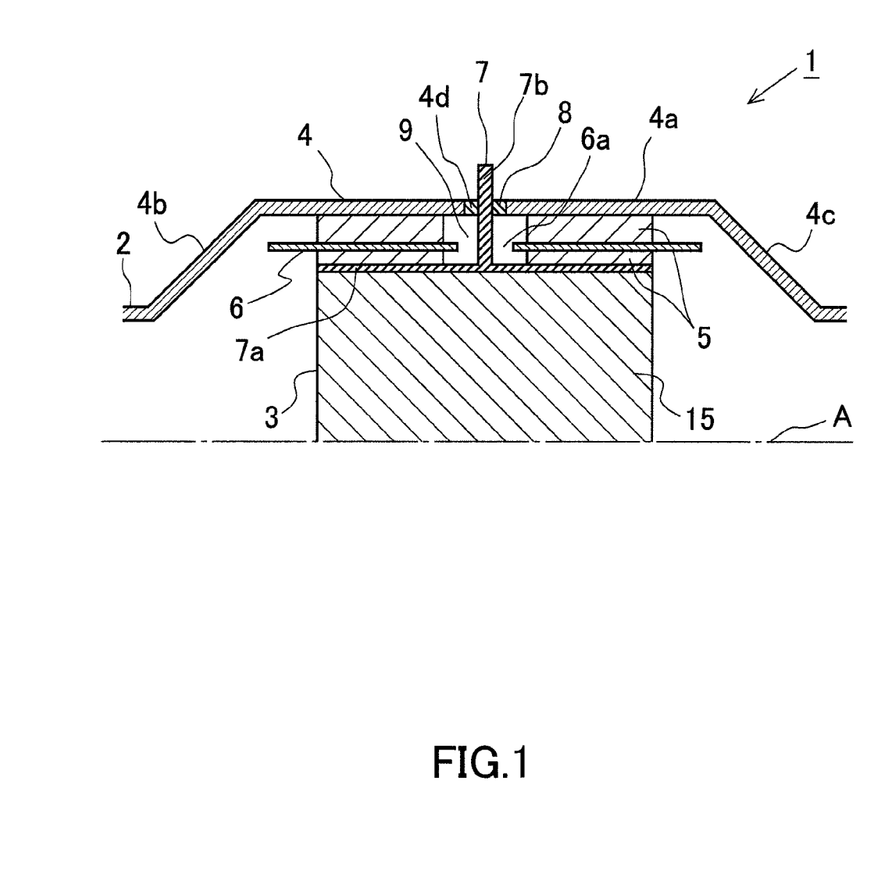
FIG. 1 is a view showing the schematic construction of an electric heating catalyst (EHC) according to an embodiment of the present invention.

FIG. 1 is a view showing the schematic construction of an electric heating catalyst (EHC) according to this first embodiment of the present invention. The EHC 1 according to this embodiment is arranged in an exhaust pipe of an internal combustion engine mounted on a vehicle. The internal combustion engine may be a diesel engine, or may be a gasoline engine. In addition, the EHC 1 according to this embodiment can also be used in a vehicle which adopts a FIG. 1 is a cross sectional view which shows the EHC 1 cut in a longitudinal direction thereof along a central axis A of the exhaust pipe 2 of the internal combustion engine. Here, note that the shape of the EHC 1 is in line symmetry with respect to the central axis A, and hence, in FIG. 1, only an upper part of the EHC 1 is shown for the sake of convenience.

The EHC 1 according to this embodiment is provided with a catalyst carrier 3, a casing 4, a mat 5, an inner pipe 6, and electrodes 7. The catalyst carrier 3 is formed in the shape of a circular cylinder, and is arranged in such a manner that a central axis thereof is in alignment with the central axis A of the exhaust pipe 2. An exhaust gas purification catalyst 15 is carried or supported by the catalyst carrier 3. As the exhaust gas purification catalyst 15, there can be exemplified an oxidation catalyst, an NOx storage reduction catalyst, an NOx selective reduction catalyst, a three-way catalyst, and so on.

The catalyst carrier 3 is formed of a material which, when electrically energized, becomes an electric resistance to generate heat. As a material for the catalyst carrier 3, there can be exemplified SiC. The catalyst carrier 3 has a plurality of passages (cells) which extend in a direction in which an exhaust gas flows (i.e., the direction of the central axis A), and which have a cross section of honeycomb shape vertical to the direction in which the exhaust gas flows. The exhaust gas purification catalyst 15 is supported by partition walls which form the individual cells, so that the exhaust gas is purified by flowing through the cells. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the casing 4.

The catalyst carrier 3 is received in the casing 4. The casing 4 is formed of metal. As a material which forms the casing 4, there can be exemplified a stainless steel material. The casing 4 has a receiving portion 4a which is constructed to include a curved surface parallel to the central axis A, and tapered portions 4b, 4c which serve to connect the receiving portion 4a and the exhaust pipe 2 with each other at the upstream side and the downstream side, respectively, of the receiving portion 4a. The receiving portion 4a has a channel cross section which is larger than that of the exhaust pipe 2, and the catalyst carrier 3, the mat 5, and the inner pipe 6 are received in the inside of the receiving portion 4a. The tapered portions 4b, 4c each take a tapered shape of which the channel cross section decreases in accordance with the increasing distance thereof from the receiving portion 4a.

The mat 5 is inserted between an inner wall surface of the receiving portion 4a of the casing 4, and an outer circumferential surface of the catalyst carrier 3. In other words, inside the casing 4, the catalyst carrier 3 is supported by the mat 5. In addition, the inner pipe 6 is inserted in the mat 5. In other words, the mat 5 is divided into a portion at the side of the casing 4 and a portion at the side of the catalyst carrier 3 by means of the inner pipe 6.

The mat 5 is formed of an electrically insulating material. As a material which forms the mat 5, there can be exemplified a ceramic fiber which includes alumina as a main component. The mat 5 is wound around the outer circumferential surface of the catalyst carrier 3 and the outer circumferential surface of the inner pipe 6. Due to the insertion of the mat 5 between the catalyst carrier 3 and the casing 4, it is possible to suppress electricity from flowing into the casing 4 at the time when the catalyst carrier 3 is electrically energized.

The inner pipe 6 is formed of an electrically insulating material. Alumina can be exemplified as a material which forms the inner pipe 6. The inner pipe 6 is formed into a tubular shape with the central axis A being located as a center thereof. As shown in FIG. 1, the inner pipe 6 has a length in the direction of the central axis A longer than that of the mat 5. As a result, the inner pipe 6 has an upstream side end and a downstream side end thereof protruded from an upstream side end face and a downstream side end face of the mat 5, respectively.

The pair of electrodes 7 are connected to the outer circumferential surface of the catalyst carrier 3 (here, note that in FIG. 1, an electrode 7 at one side (upper side) alone is illustrated). Each electrode 7 is formed of a surface electrode 7a and a stem electrode 7b. The surface electrode 7a is formed on the outer circumferential surface of the catalyst carrier 3. Here, note that the details of the surface electrode 7a will be described later. The stem electrode 7b has one end thereof connected to the surface electrode 7a. And, the stem electrode 7b has the other end thereof protruded to the outside of the casing 4 through an electrode chamber 9.

The casing 4 and the inner pipe 6 have through holes 4d, 6a opened therein so as to allow the stem electrodes 7b to pass through them, respectively. Also, the mat 5 has a space formed therein so as to allow the stem electrodes 7b to pass therethrough. The electrode chamber 9 is formed by such a space which is located between the inner wall surface of the casing 4 and the outer circumferential surface of the catalyst carrier 3, and which has a side wall surface thereof formed by the mat 5. Support members 8, which serve to support the stem electrodes 7b, respectively, are arranged in the through holes 4d (i.e., an upper portion of the electrode chamber 9) which are opened in the casing 4. The support members 8 are formed of an electrically insulating material, and are fitted with no gap between the casing 4 and the stem electrodes 7b.

The stem electrodes 7b have the other ends thereof electrically connected to a battery (not shown). Electricity is supplied to the electrodes 7 from the battery. When electricity is supplied to the electrode 7, the catalyst carrier 3 is electrically energized. When the catalyst carrier 3 generates heat by energization thereof, the exhaust gas purification catalyst 15 supported by the catalyst carrier 3 is heated, so that the activation thereof is facilitated.

Here, note that in this embodiment, the catalyst carrier 3 corresponds to a heater element according to the present invention. However, the heater element according to the present invention is not limited to a carrier which supports a catalyst, but instead the heater element may be a structure which is arranged at the upstream side of a catalyst, for example.

Figure 9:
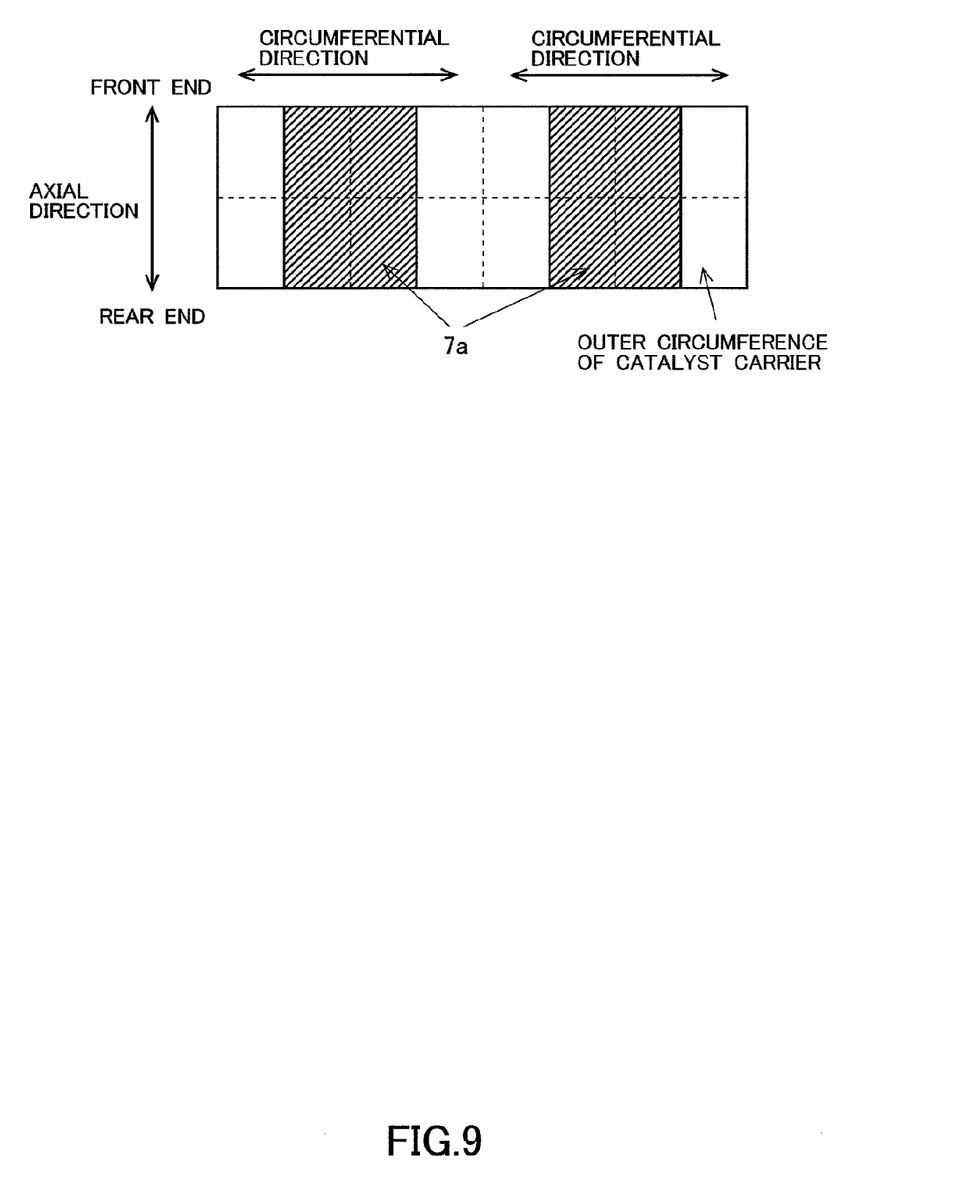
FIG. 9 is a view showing a state in which an outer circumferential surface of a catalyst carrier in a conventional EHC has been developed.

Here, reference will be made to the construction of the surface electrodes and the heat generation state of the catalyst carrier at the time of electrical energization in the conventional EHC, based on FIG. 9 and FIG. 10. FIG. 9 is a view showing a state in which the outer circumferential surface of the catalyst carrier in the conventional EHC has been developed. In FIG. 9, diagonally shaded areas indicate those portions in which the surface electrodes 7a are arranged. As shown in FIG. 9, in the conventional EHC, two surface electrodes 7a are formed on the outer circumferential surface of the catalyst carrier 3 so as to be in opposition to each other with the catalyst carrier 3 sandwiched therebetween and in parallel to an axial direction of the catalyst carrier 3.

Figure 10:
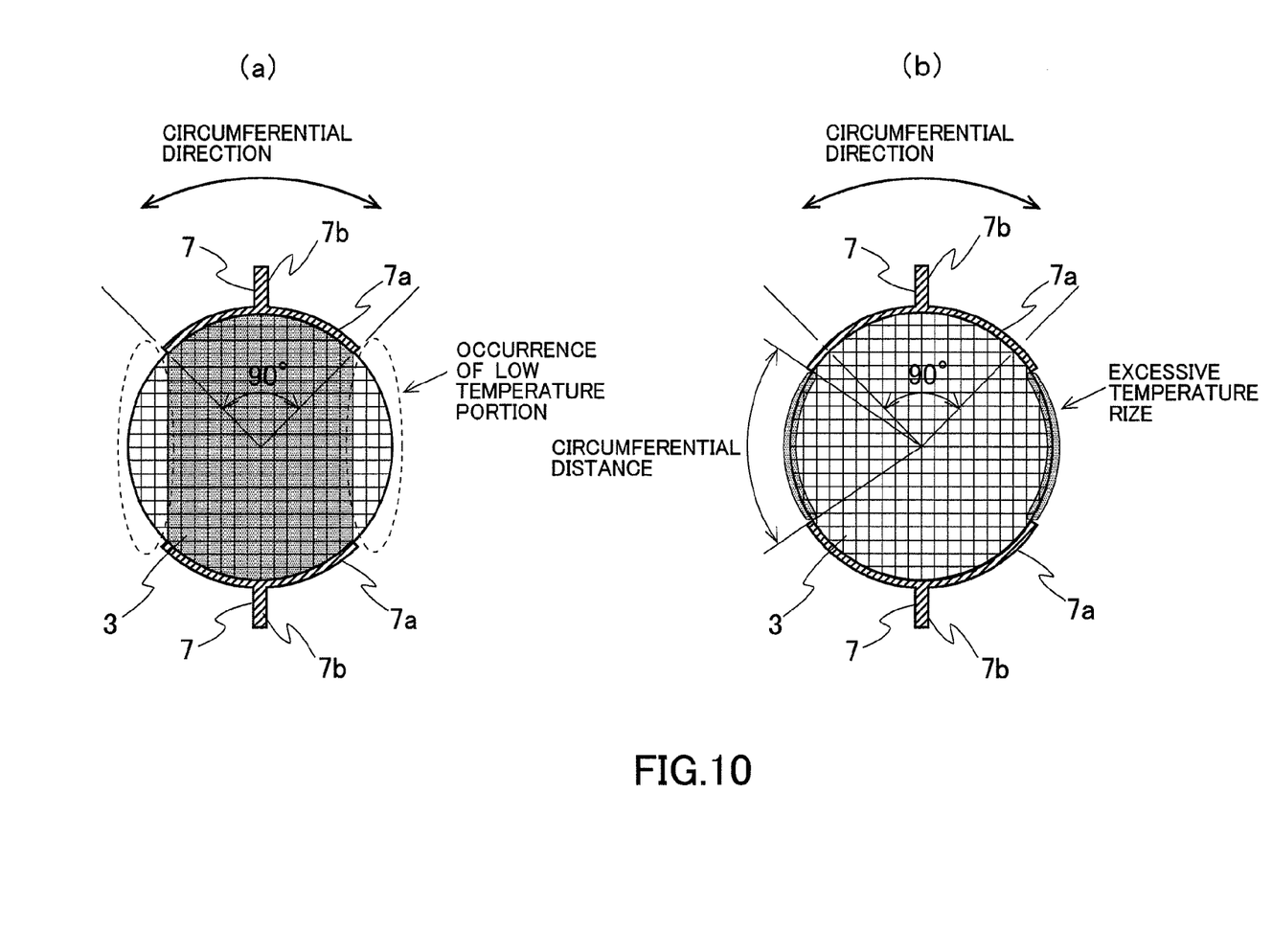
FIG. 10 shows a cross sectional view of the catalyst carrier and electrodes in the conventional EHC in a direction orthogonal to an axial direction of the catalyst carrier.

FIG. 10 shows a cross sectional view of the catalyst carrier and electrodes in the conventional EHC, on which the surface electrodes are formed as shown in FIG. 9, in the direction orthogonal to the axial direction of the catalyst carrier. FIG.

10(a) shows a cross sectional view in cases where the width of each surface electrode 7a in a circumferential direction of the catalyst carrier 3 is relatively small (for example, in cases where the width of each surface electrode 7a is at a central angle of 90 degrees), and FIG. 10(b) shows a cross sectional view in cases where the width of each surface electrode 7a in the circumferential direction of the catalyst carrier 3 is relatively large (for example, in cases where the width of each surface electrode 7a is at a central angle larger than 90 degrees).

In cases where the width of each surface electrode 7a is relatively small, as shown in FIG. 10(a), when the electrodes 7 are energized, electric current flows through an inter-electrode part (a part shown in a gray color in FIG. 10(a)) located between the surface electrodes in the heater element 3. For that reason, the temperature of the inter-electrode part rises. However, it is difficult for electric current to flow into extraelectrode parts (parts surrounded by broken lines, respectively, in FIG. 10(a)) which are portions outwardly away from between the surface electrodes in the heater element 3. For that reason, the extraelectrode parts are difficult to rise in temperature, thus becoming low temperature portions.

When such low temperature portions occur in the catalyst carrier 3, the exhaust gas purification capacity of the catalyst is no longer exhibited in the low temperature portions to a sufficient extent, thus causing a decrease in an exhaust gas purification rate. In addition, if a variation in the temperature of the catalyst carrier 3 becomes large, thermal stress will become large, so there will also be a fear that the catalyst carrier 3 may be damaged or broken.

On the other hand, when the width of each surface electrode 7a is made large so as to suppress the occurrence of the low temperature portions in the catalyst carrier 3, as shown in FIG. 10(b), an outer circumferential distance between the surface electrodes becomes small. Then, as shown in FIG. 10(b), when the outer circumferential distance between the surface electrodes becomes equal to or smaller than a certain extent, it becomes easy for electric current to flow through the outer circumferential surface (parts shown in gray color in FIG. 10(b)) of the catalyst carrier 3 more intensively. As a result, there is a fear that those portions of the outer circumferential surface located between the surface electrodes may rise in temperature to an excessive extent.

Figure 2:
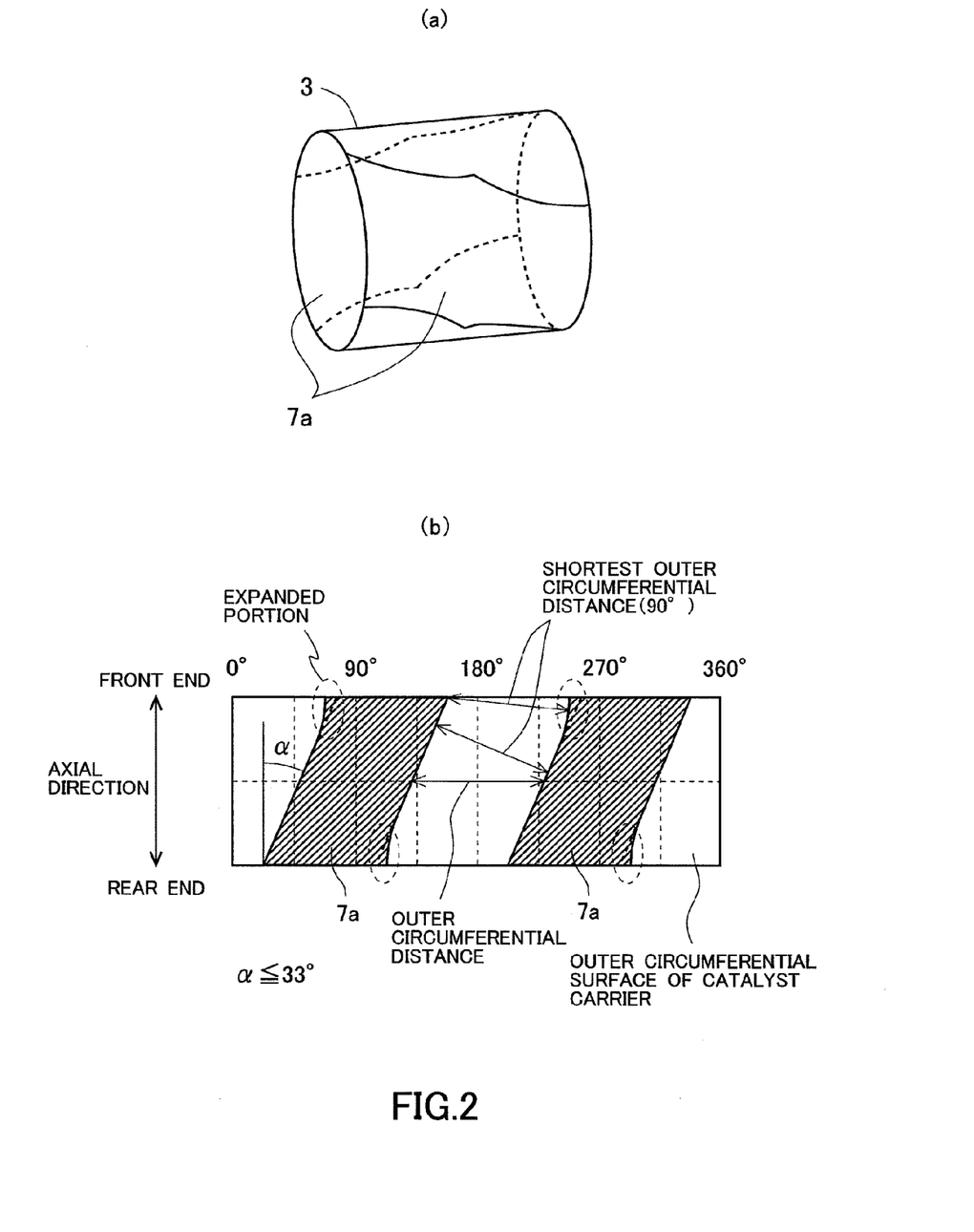
FIG. 2 is a view showing the schematic construction of surface electrodes in the EHC according to the embodiment.

Accordingly in the EHC according to this embodiment, the surface electrodes 7a are constructed to form a spiral along the outer circumferential surface of the catalyst carrier 3. FIG. 2 is a view showing the schematic construction of the surface electrodes in the EHC according to this embodiment. FIG. 2(a) shows a perspective view of the catalyst carrier, and FIG. 2(b) is a view showing a state in which the outer circumferential surface of the catalyst carrier has been developed. In FIG. 2(b), diagonally shaded areas indicate portions in which the surface electrodes 7a are arranged.

In the EHC according to this embodiment, as shown in FIG. 2, the surface electrodes 7a are formed in such a manner as inclined at a predetermined angle α with respect to the axial direction of the catalyst carrier 3, and spirally extend from one end toward the other end of the catalyst carrier 3 along the outer circumferential surface of the catalyst carrier 3. In addition, the two surface electrodes 7a are formed in such a manner that they mutually cross each other with the catalyst carrier 3 being sandwiched therebetween.

Figure 3:
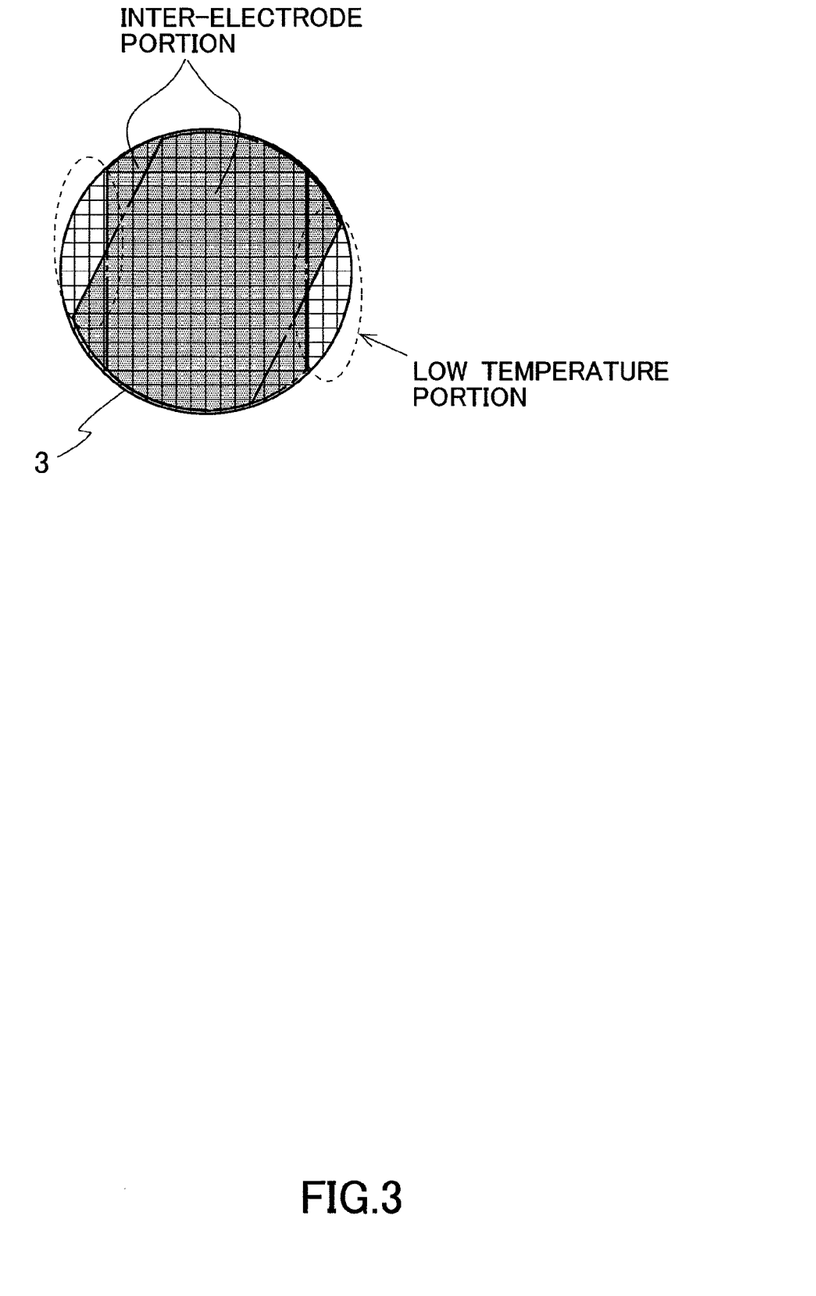
FIG. 3 is a view showing a portion occupied by an inter-electrode part in a cross section in a direction orthogonal to an axial direction of the catalyst carrier according to the embodiment.

When the surface electrodes 7a are spirally formed along the outer circumferential surface of the catalyst carrier 3 in this manner, the position of the inter-electrode part in the cross section in the direction orthogonal to the axial direction of the catalyst carrier 3 shifts in a direction rotating around the axis of the catalyst carrier 3 as it moves from a front end to a rear end of the catalyst carrier 3. As a result, when viewed in the axial direction of the catalyst carrier 3 as a whole, the proportion occupied by the inter-electrode part (the part shown in gray color in FIG. 3) in the cross section in the direction orthogonal to the axial direction of the catalyst carrier 3 becomes larger in comparison with the case where the surface electrodes 7a are formed in parallel to the axial direction of the catalyst carrier 3, as shown in FIG. 3. For that reason, when viewed in the axial direction of the catalyst carrier 3 as a whole, the proportion occupied by the extraelectrode parts (the parts surrounded by the broken lines, respectively, in FIG. 3) in the cross section in the direction orthogonal to the axial direction of the catalyst carrier 3, which become the low temperature portions in which electric current does not flow at the time of electrical energization, can be made small.

Accordingly, it is possible to decrease the flow rate of the exhaust gas which passes through the activated EHC 1 without being in contact with the exhaust gas purification catalyst 15. As a result, the exhaust gas purification rate can be improved. In addition, variation in the temperature distribution of the catalyst carrier 3 at the time of electrical energization is suppressed, so it is possible to suppress the catalyst carrier 3 from being broken or damaged.

Here, reference will be made to an angle of gradient (hereinafter, this angle of gradient being referred to as a spiral angle) of the surface electrodes 7a with respect to the axial direction of the catalyst carrier 3 in the case of forming the surface electrodes 7a into a spiral shape along the outer circumferential surface of the catalyst carrier 3, based on FIGS. 4 and 5. Here, note that in cases where the surface electrodes 7a are formed in parallel to the axial direction of the catalyst carrier 3, the width of each surface electrode 7a and the distance between the surface electrodes become the lengths of circular arcs around the axis of the catalyst carrier 3, respectively. Accordingly, in the following, the width of each surface electrode 7a and the distance between the surface electrodes are represented as the central angles of circular arcs around the axis of the catalyst carrier 3, respectively, in the case of assuming that the surface electrodes 7a are formed in parallel to the axial direction of the catalyst carrier 3.

Figure 4:
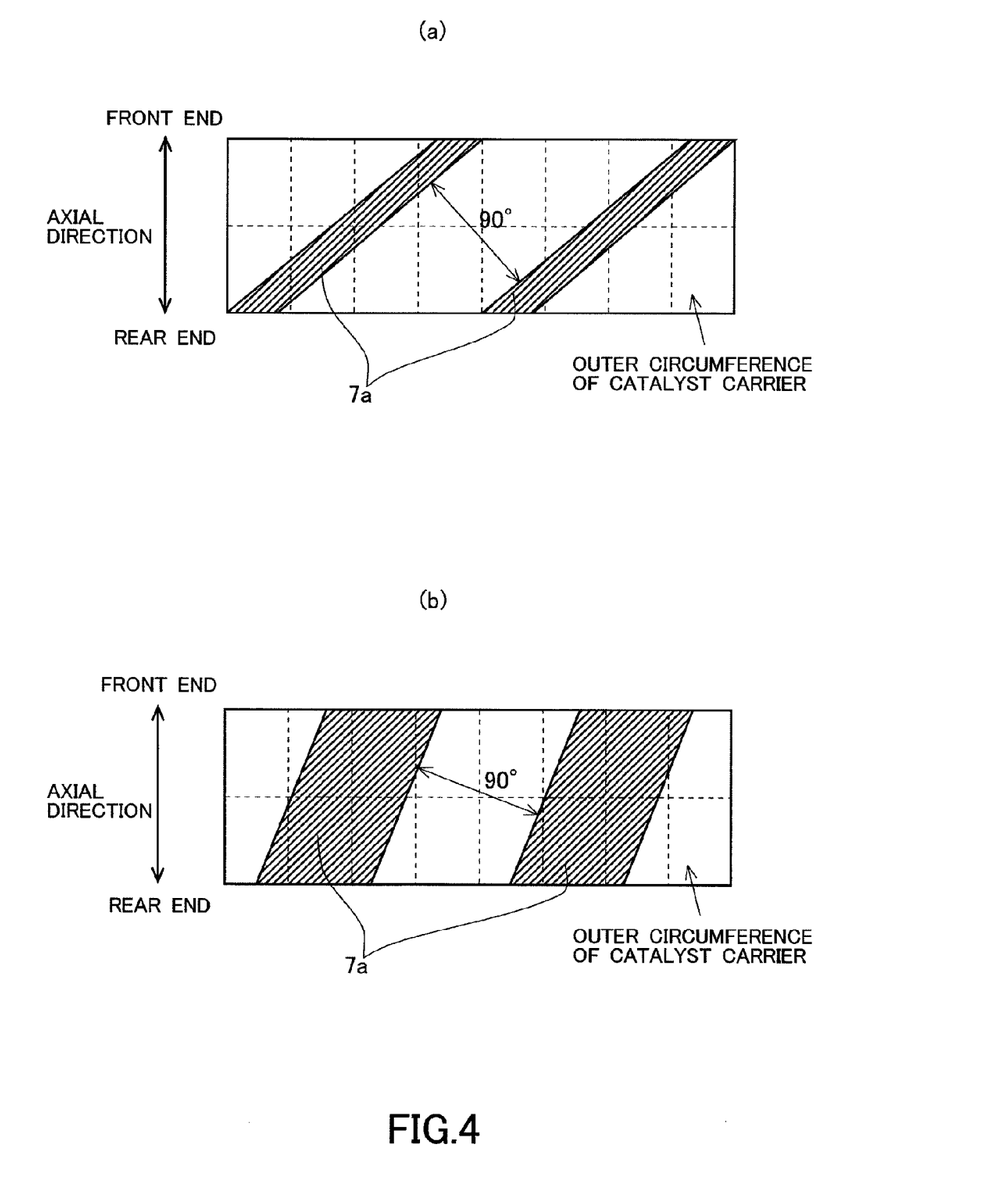
FIG. 4 is a view showing a state in which the outer circumferential surface of the catalyst carrier in the case of forming the surface electrodes into a spiral shape along the outer circumferential surface of the catalyst carrier has been developed.

FIG. 4 is a view showing a state in which the outer circumferential surface of the catalyst carrier in the case of forming the surface electrodes into a spiral shape along the outer circumferential surface of the catalyst carrier has been developed. FIG. 4(a) shows a developed view of the outer circumferential surface of the catalyst carrier in cases where a spiral angle of each surface electrode is relatively large, and FIG. 4(b) shows a developed view of the outer circumferential surface of the catalyst carrier in cases where the spiral angle of each surface electrode is relatively small. In FIGS. 4(a), 4(b), diagonally shaded areas indicate those portions in which the surface electrodes 7a are arranged.

As shown in FIG. 4, when the spiral angle of each surface electrode 7a is made larger, the length of each surface electrode 7a on the outer circumferential surface of the catalyst carrier 3 can be made longer. However, even in cases where the surface electrodes 7a are formed into the spiral shape, it is necessary to ensure the shortest distance between the surface electrodes on the outer periphery of the catalyst carrier 3 (hereinafter this distance being referred to as the shortest outer circumferential distance) to such an extent as to suppress electric current from flowing through the outer circumferential surface of the catalyst carrier 3. According to a keen and earnest study by the inventor of the present invention, it has been found that in order to suppress electric current from flowing through the outer circumferential surface of the catalyst carrier 3, it is necessary to make the shortest outer circumferential distance between the surface electrodes equal to or larger than a central angle of 90 degrees.

Accordingly, in FIGS. 4(a) and 4(b), the shortest outer circumferential distance between the surface electrodes is set to be a central angle of 90 degrees. If the shortest outer circumferential distance between the surface electrodes is set constant at the central angle of 90 degrees, when the spiral angle of each surface electrode 7a is large, the width of each surface electrode 7a becomes smaller in comparison with the case where this spiral angle is small. However, if the width of each surface electrode 7a becomes small to an excessive extent, it will become difficult to raise the temperature of the catalyst carrier 3 in a sufficient range. According to the keen and earnest study by the inventor of the present invention, it has been found that in order to raise the temperature of the catalyst carrier 3 in a sufficient range, it is necessary to make the width of each surface electrode 7a equal to or larger than a central angle of 60 degrees.

Figure 5:
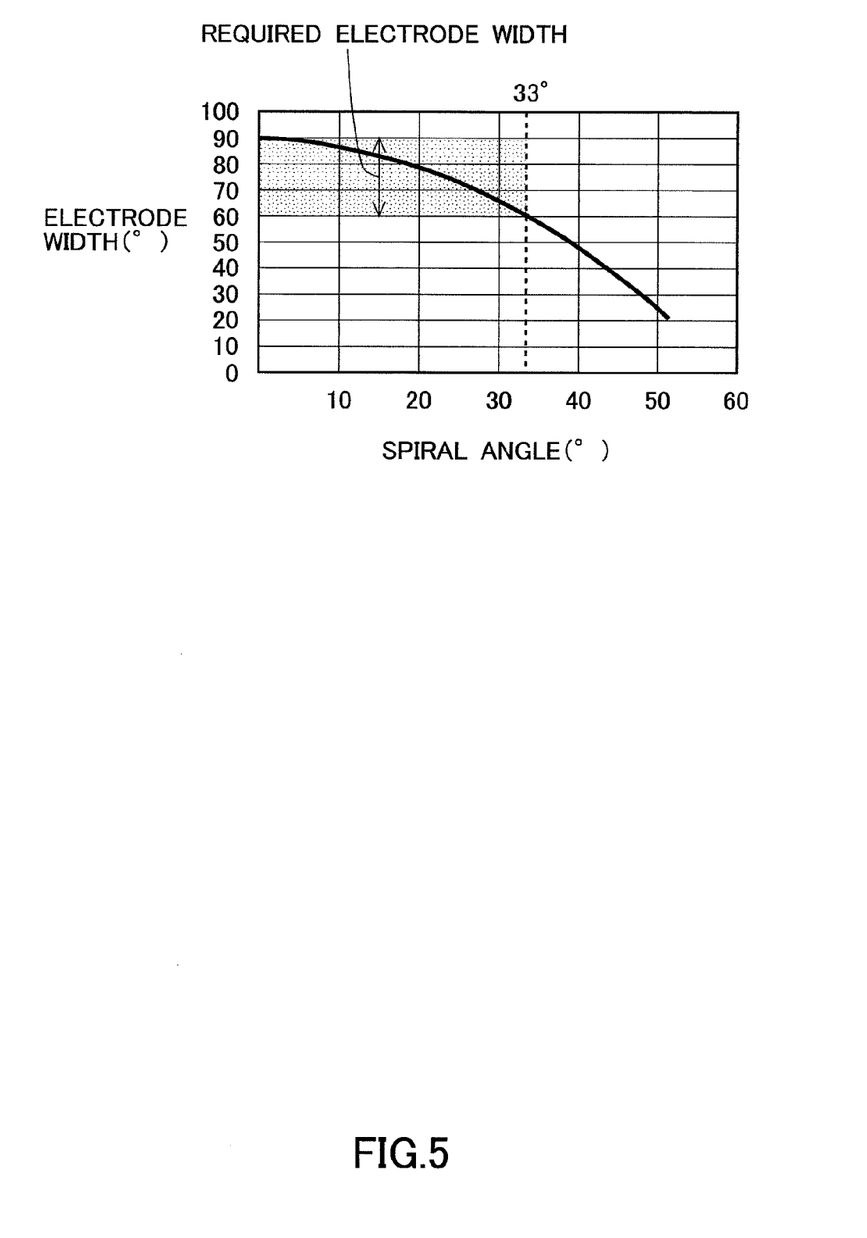
FIG. 5 is a view showing the relation between the spiral angle of each surface electrode and the width of each surface electrode when the shortest distance on the outer periphery between the surface electrodes is set at a central angle of 90 degrees.

FIG. 5 is a view showing the relation between the spiral angle of each surface electrode and the width of each surface electrode when the shortest outer circumferential distance between the surface electrodes is set at the central angle of 90 degrees. As shown in FIG. 5, the larger the spiral angle of each surface electrode 7a, the smaller the width of each surface electrode 7a becomes. Then, as stated above, in order to raise the temperature of the catalyst carrier 3 in a sufficient range, it is necessary to make the width of each surface electrode 7a equal to or larger than the central angle of 60 degrees. To satisfy such a condition, as can be seen from FIG. 5, it is necessary to make the spiral angle of each surface electrode 7a equal to or less than 33 degrees.

In other words, it is necessary to set the shortest outer circumferential distance between the surface electrodes to be a central angle of 90 degrees in order to suppress electric current from flowing through the outer circumferential surface of the catalyst carrier 3, and it is also necessary to set the spiral angle of each surface electrode 7a to be equal to or less than 33 degrees in order to form the surface electrodes 7a into a spiral shape along the outer periphery of the catalyst carrier 3, while setting the width of each surface electrode 7a to be equal to or larger than a central angle of 60 degrees. For that reason, in the EHC according to this embodiment, too, the shortest outer circumferential distance between the surface electrodes is at a central angle of 90 degrees, and the spiral angle of each surface electrode 7a is equal to or less than 33 degrees (an angle α as shown in FIG. 2(b)).

Returning to FIG. 2, the construction of the surface electrodes of the EHC according to this embodiment will be further explained. In cases where the surface electrodes 7a are formed into a spiral shape along the outer periphery of the catalyst carrier 3, the shortest outer circumferential distance between the surface electrodes in the end face portions of the catalyst carrier 3 usually becomes a distance between the surface electrodes (hereinafter this distance being referred to as an outer circumferential distance) in a direction parallel to the circumference of an end of the catalyst carrier 3 on the outer periphery of the catalyst carrier 3. In contrast to this, in portions other than the vicinity of the end of the catalyst carrier 3, a distance between the surface electrodes in the direction orthogonal to the surface electrodes 7a on the outer periphery of the catalyst carrier 3 becomes the shortest outer circumferential distance between the surface electrodes (in this embodiment, the shortest outer circumferential distance in these portions being set to be a central angle of 90 degrees). Accordingly, the shortest outer circumferential distance in the vicinity of the end of the catalyst carrier 3 is larger than the shortest outer circumferential distance (=the central angle of 90 degrees) in the other portions.

Accordingly, in this embodiment, as shown in FIG. 2, the surface electrodes 7a are formed into a spiral shape along the outer periphery of the catalyst carrier 3, and at the same time, the width of each surface electrode 7a in the vicinity of its end portions which are in contact with the circumferences of the ends of the catalyst carrier 3, respectively, is enlarged. More specifically, as shown in FIG. 2(b), if the width of each surface electrode 7a in its end portions is not enlarged, it is enlarged by outwardly expanding or widening sides of each surface electrode 7a which intersect the circumferences of the end faces of the catalyst carrier 3 at an acute angle.

As a result of this, the shortest outer circumferential distance (i.e., the outer circumferential distance between the surface electrodes in the end face portions of the catalyst carrier 3) between the surface electrodes in the vicinity of the end faces of the catalyst carrier 3 is set to be the same as the shortest outer circumferential distance (=a central angle of 90 degrees) between the surface electrodes in the portions other than the vicinity of the end faces of the catalyst carrier 3. In other words, a distance from an outwardly expanded side in one of the surface electrodes 7a to an intersection between a side of the other surface electrode 7a opposing to the outwardly expanded side of the one surface electrode 7a and a circumference of an end face of the catalyst carrier 3 is set to be the central angle of 90 degrees.

By constructing the surface electrodes in the manner as mentioned above, the proportion occupied by the inter-electrode part in the cross section orthogonal to the axial direction of the catalyst carrier 3 in the vicinity of the ends of the catalyst carrier 3 can be made as large as possible within a range in which it is possible to suppress electric current from flowing through the outer circumferential surface of the catalyst carrier 3. In other words, it becomes possible to raise the temperature of the catalyst carrier 3 in the vicinity of its ends in a wider range in the cross sectional direction orthogonal to the axial direction of the catalyst carrier 3.

Accordingly, when viewed in the axial direction of the catalyst carrier 3 as a whole, the portions thereof, which become low temperature portions at the time of electrical energization, can be made smaller in the cross sectional direction orthogonal to the axial direction of the catalyst carrier 3. For that reason, the exhaust gas purification rate can be improved, and breakage or damage of the catalyst carrier 3 can be suppressed.

Here, note that in this embodiment, as mentioned above, in cases where the width of each surface electrode 7a in the vicinity of the ends thereof is enlarged, the shortest outer circumferential distance of that portion which is enlarged in width is not necessarily the same as the shortest outer circumferential distance (=a central angle of 90 degrees) in other portions. If the width of each surface electrode 7a at the ends thereof is enlarged in a range in which the outer circumferential distance between the surface electrodes in the ends of the catalyst carrier 3 is equal to or more than the shortest outer circumferential distance in the other portions, it will be possible to suppress electric current from flowing through the outer circumferential surface of the catalyst carrier 3.

<First Modification>

Figure 6:
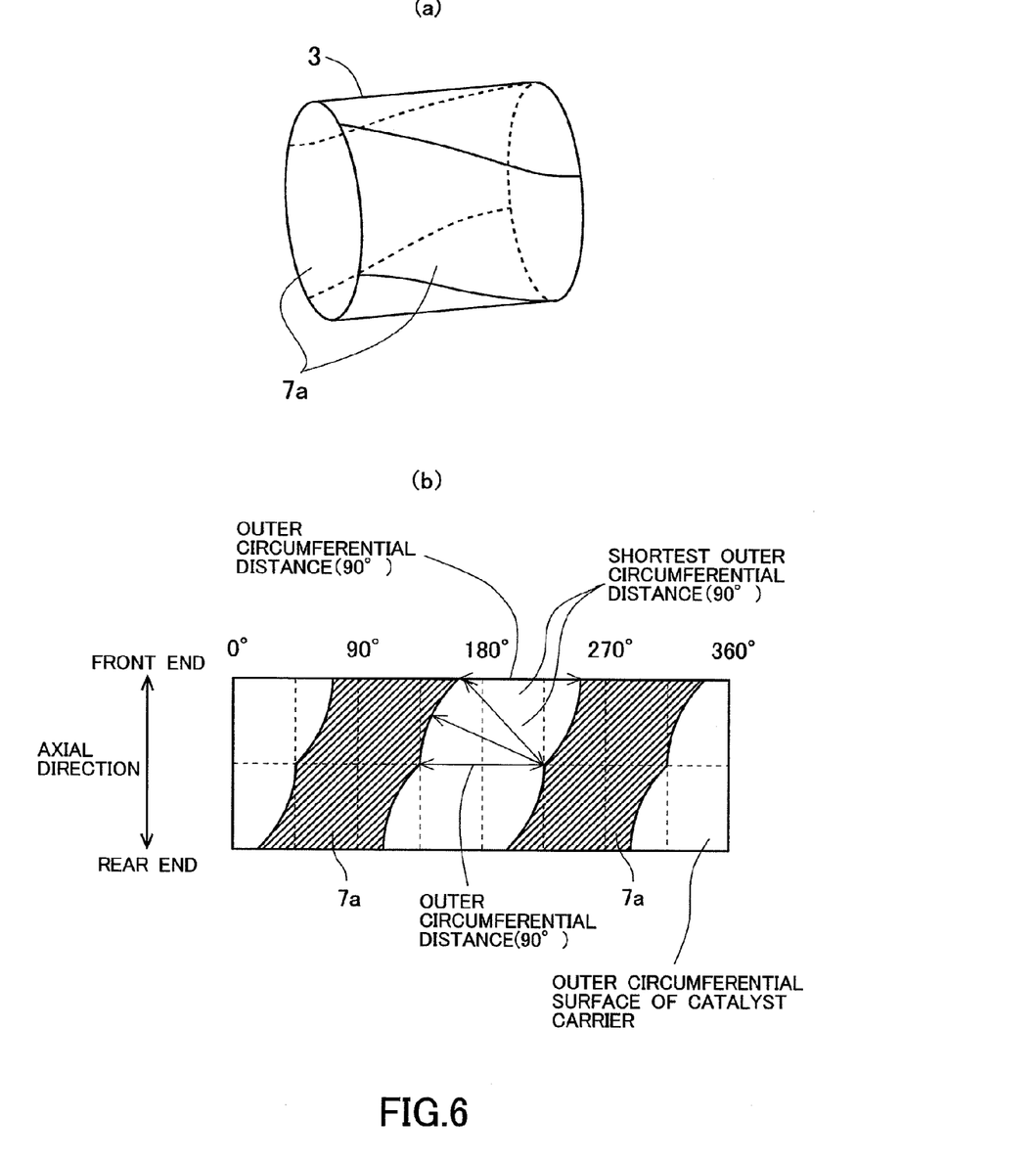
FIG. 6 is a view showing the schematic construction of surface electrodes in an EHC according to a first modified form (first modification) of the embodiment.

In the following, reference will be made to a first modification of this embodiment. FIG. 6 is a view showing the schematic construction of surface electrodes in an EHC according to this modification. FIG. 6(a) shows a perspective view of a catalyst carrier, and FIG. 6(b) is a view showing a state in which an outer circumferential surface of the catalyst carrier has been developed. In FIG. 6(b), diagonally shaded areas indicate portions in which the surface electrodes 7a are arranged.

In this modification, similarly as described above, the surface electrodes 7a each spirally extend from one end toward the other end of the catalyst carrier 3 along the outer circumferential surface of the catalyst carrier 3. In addition, the two surface electrodes 7a are formed in such a manner that they mutually cross each other with the catalyst carrier 3 being sandwiched therebetween. Then, in this embodiment, as shown in FIG. 6, the width of each surface electrode 7a in the vicinity of its end portions which are in contact with the circumferences of the ends of the catalyst carrier 3, respectively, and the width of each surface electrode 7a in the vicinity of its longitudinally central portion in a direction parallel to the circumferences of the end faces of the catalyst carrier 3 are enlarged.

At this time, the outer circumferential distances or lengths of the ends and the central portion of the surface electrodes 7a (i.e., those portions which are enlarged in width in the direction parallel to the circumferences of the end faces of the catalyst carrier 3) are set to be the same as the shortest outer circumferential distance (=a central angle of 90 degrees) in the other portions. Here, note that in this case, as shown in FIG. 6(b), the shortest outer circumferential distance in the portions other than the ends and the central portion of each surface electrode 7a is a distance on the outer circumferential surface of the catalyst carrier 3 from vertices of those portions in one surface electrode 7a which are enlarged in width to the other surface electrode 7a.

According to the above construction, the proportions occupied by the inter-electrode part in the cross section orthogonal to the axial direction of the catalyst carrier 3 in the vicinity of the ends and the central portion of the catalyst carrier 3, respectively, can be made as large as possible, while suppressing electric current from flowing through the outer circumferential surface of the catalyst carrier 3. In other words, it becomes possible to raise the temperature of the catalyst carrier 3 in the vicinity of its ends and in the vicinity of its central portion in a wider range in the cross sectional direction orthogonal to the axial direction of the catalyst carrier 3.

Also, according to the construction of the surface electrodes 7a according to this modification, when viewed in the axial direction of the catalyst carrier 3 as a whole, the portions thereof, which become low temperature portions at the time of electrical energization, can be made smaller in the cross sectional direction orthogonal to the axial direction of the catalyst carrier 3. For that reason, the exhaust gas purification rate can be improved, and breakage or damage of the catalyst carrier 3 can be suppressed.

Here, note that in this embodiment, as mentioned above, the outer circumferential distances between the surface electrodes in those portions which are enlarged in width in the direction parallel to the circumferences of the end faces of the catalyst carrier 3 are not necessarily the same as the shortest outer circumferential distance (=a central angle of 90 degrees) in the other portions. If the width of each surface electrode 7a at its ends and its central portion is enlarged in a range in which the outer circumferential distances between the surface electrodes in the ends and the central portion of the catalyst carrier 3 are equal to or more than the shortest outer circumferential distance in the other portions, it will be possible to suppress electric current from flowing through the outer circumferential surface of the catalyst carrier 3.

<Second Modification>

In the following, reference will be made to a second modification of this embodiment. As in the above-mentioned embodiment and the first modification, if the width of each surface electrode 7a in a portion(s) thereof in the direction parallel to the circumferences of the end faces of a catalyst carrier 3 is enlarged, in the portion(s) which is enlarged in width, a rectilinear distance between the surface electrodes becomes smaller in comparison with those portions which are not enlarged in width. Here, note that the rectilinear distance between the surface electrodes is the length of a straight line when the side ends of both the surface electrodes 7a are connected with each other by the straight line which passes through the inside of the catalyst carrier 3 and is orthogonal to the axial direction of the catalyst carrier 3.

A part with a large rectilinear distance between the surface electrodes, tends to allow, upon electrical energization thereof, electric current to flow through the outer circumferential surface of the catalyst carrier 3 more easily in comparison with a part with a small rectilinear distance between these the surface electrodes. Accordingly, in this modification, the shortest outer circumferential distance between the surface electrodes is not set constant at 90 degrees, but instead is corrected or modified according to the rectilinear distance between the surface electrodes.

Figure 7:
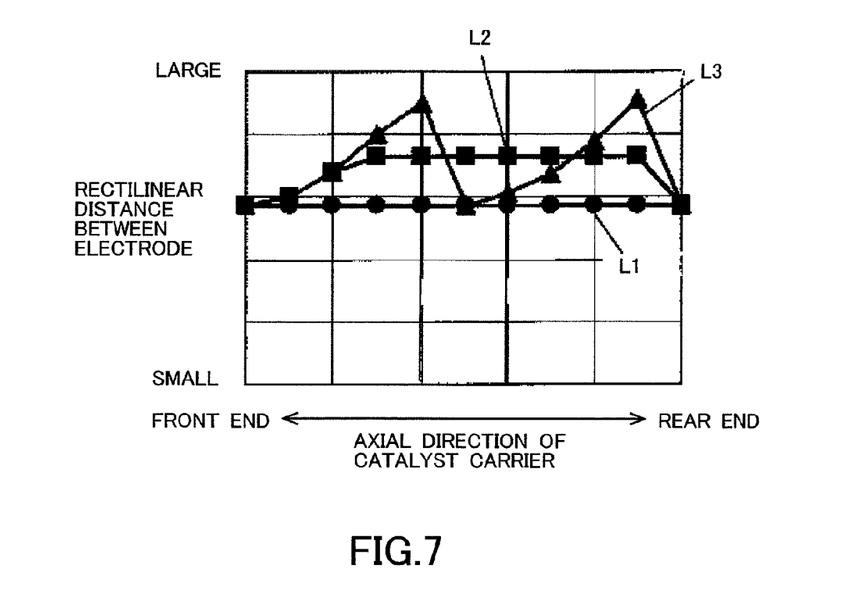
FIG. 7 is a view showing rectilinear distances between surface electrodes in individual positions between from a front end to a rear end of a catalyst carrier according to a second modified form (modification) of the embodiment.
Figure 8:
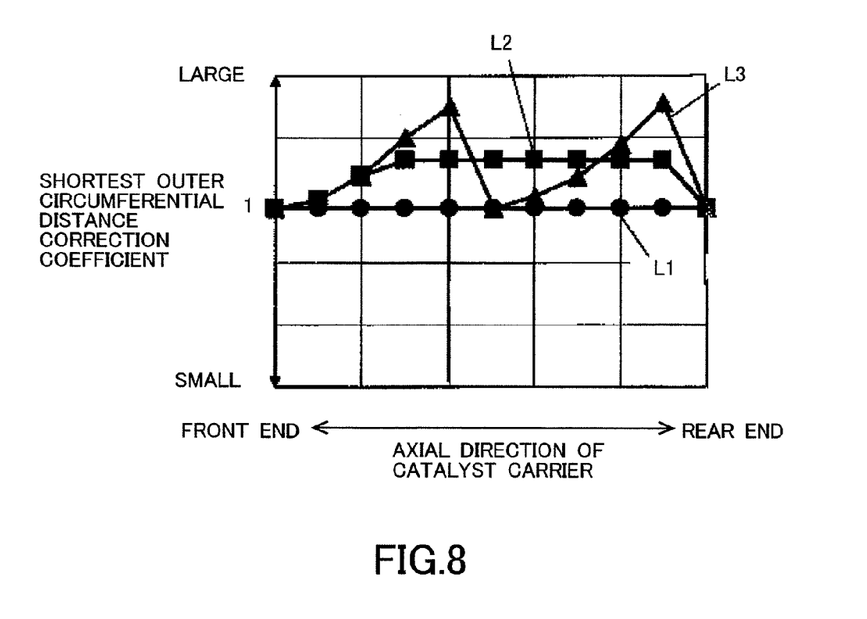
FIG. 8 is a view showing, in the second modification of the embodiment, correction coefficients in the individual positions between from the front end to the rear end of the catalyst carrier when the shortest distance on the outer periphery between the surface electrodes is corrected.

FIG. 7 is a view showing rectilinear distances between the surface electrodes in individual positions between from a front end to a rear end of the catalyst carrier 3. FIG. 8 is a view showing, in this second modification, correction coefficients in the individual positions between from the front end to the rear end of the catalyst carrier 3 at the time when the shortest outer circumferential distance between the surface electrodes is corrected. In FIG. 8, the correction is made in such a manner that the larger the correction coefficient, the larger the shortest outer circumferential distance between the surface electrodes becomes. In addition, in FIGS. 7 and 8, L1 shows values in cases where conventional surface electrodes 7a are formed horizontal or parallel to the axial direction of the catalyst carrier 3; L2 shows values in cases where the surface electrodes 7a are formed spirally and the width of each surface electrode 7a in the vicinity of its ends is enlarged, as shown in FIGS. 2; and L3 shows values in cases where the surface electrodes 7a are formed spirally and the width of each surface electrode 7a in the vicinity of its ends and in the vicinity of its central portion is enlarged, as shown in FIG. 6.

As shown in FIGS. 7 and 8, in this modification, the large the rectilinear distance between the surface electrodes, the larger the shortest outer circumferential distance between the surface electrodes is set. Specifically, as shown in FIG. 2 and FIG. 6, in cases where the width of each surface electrode 7a in a portion(s) thereof in the direction parallel to the circumferences of the end faces of the catalyst carrier 3 is enlarged, the width of each surface electrode 7a in its portions which are not enlarged in width is made smaller.

Thus, by correcting the shortest outer circumferential distance between the surface electrodes in this manner, in those portions of the surface electrodes which are not enlarged in width, it is possible to suppress, with a higher probability, electric current from flowing through the outer circumferential surface of the catalyst carrier 3.

DESCRIPTION OF THE REFERENCE NUMERALS AND SYMBOLS

1 . . . electric heating catalyst (EHC)
3 . . . catalyst carrier
4 . . . casing
7 . . . electrodes
7a . . . surface electrodes
7b . . . stem electrodes

The invention claimed is:

1. An electric heating catalyst comprising:
   a heater element that is formed into a cylindrical shape, and is electrically energized to generate heat so that a catalyst is heated by the generation of heat; and
   a pair of electrodes that supply electricity to said heater element, and are connected to an outer circumferential surface of said heater element so as to sandwich said heater element therebetween;
   wherein said pair of electrodes have surface electrodes formed in such a manner that they extend spirally from one end of said heater element toward the other end thereof along the outer circumferential surface of said heater element, and mutually cross each other while sandwiching said heater element therebetween, and a shortest distance between the surface electrodes on the outer periphery of the heater element is equal to or more than a central angle of 90 degrees, and a width of each surface electrode is equal to or larger than a central angle of 60 degrees; and
   the width in each of said surface electrodes in the vicinity of their ends which are in contact with circumferences of end faces of said heater element is enlarged in a range in which the shortest distance on the outer periphery of said heater element between the surface electrodes in the vicinity of said ends becomes equal to or more than a central angle of 90 degrees.

2. The electric heating catalyst as set forth in claim 1, wherein
   further, the width in each of said surface electrodes in the vicinity of their longitudinally central portion in a direction parallel to the circumferences of the end faces of said heater element is enlarged in a range in which the shortest distance on the outer periphery of said heater element between the surface electrodes in the vicinity of said central portion becomes equal to or more than a central angle of 90 degrees.

3. The electric heating catalyst as set forth in claim 2, wherein
   the shortest distance on the outer periphery of said heater element between the surface electrodes in those portions in which the width of each of said surface electrodes is not enlarged is at central angle of 90 degrees.

4. The electric heating catalyst as set forth in claim 2, wherein
   the shortest distance on the outer periphery of said heater element between the surface electrodes in those portions in which the width of each of said surface electrodes is not enlarged is larger than the shortest distance on the outer periphery of said heater element between the surface electrodes in those portions in which the width of each of said surface electrodes is enlarged.

5. The electric heating catalyst as set forth in claim 1, wherein the shortest distance on the outer periphery of said heater element between the surface electrodes in those portions in which the width of each of said surface electrodes is not enlarged is at a central angle of 90 degrees.

6. The electric heating catalyst as set forth in claim 1, wherein
   the shortest distance on the outer periphery of said heater element between the surface electrodes in those portions in which the width of each of said surface electrodes is not enlarged is larger than the shortest distance on the outer periphery of said heater element between the surface electrodes in those portions in which the width of each of said surface electrodes is enlarged.

* * * * *